United States Patent [19]

Kindig

[11] 4,160,316
[45] Jul. 10, 1979

[54] APPARATUS FOR POSITIONING INSULATING MEMBERS IN MAGNETIC CORE SLOTS

[75] Inventor: Alan L. Kindig, Holland, Mich.

[73] Assignee: General Electric Company, Fort Wayne, Ind.

[21] Appl. No.: 883,462

[22] Filed: Mar. 6, 1978

Related U.S. Application Data

[62] Division of Ser. No. 779,777, Mar. 21, 1977, Pat. No. 4,104,788.

[51] Int. Cl.² ............................................. H02K 15/10
[52] U.S. Cl. ........................................ 29/734; 29/736
[58] Field of Search ................. 29/732, 734, 736, 596; 310/42, 214

[56] References Cited

U.S. PATENT DOCUMENTS

| | | | |
|---|---|---|---|
| 2,619,716 | 12/1952 | Swift | 29/734 |
| 2,808,640 | 10/1957 | Biddison | 29/734 |
| 2,873,514 | 2/1959 | Mills | 29/736 |
| 2,873,515 | 2/1959 | Winstrom | 29/736 |
| 3,127,662 | 4/1964 | Moore | 29/734 |
| 3,129,499 | 4/1964 | Greene | 29/736 |
| 3,191,282 | 6/1965 | Moore | 29/734 |
| 3,507,029 | 4/1970 | Stuckey et al. | 29/596 X |
| 4,003,116 | 1/1977 | Bale | 29/734 |
| 4,026,009 | 5/1977 | Kindig et al. | 29/596 |

Primary Examiner—Carl E. Hall
Attorney, Agent, or Firm—A. Burgess Lowe

[57] ABSTRACT

Permanent insulators made from known insulator material (e.g., polyethylene terephalate) are used in lieu of temporary fiber wedges, even though such wedges are not axially centered in core slots, without requiring the performance of manual labor in order to axially reposition the "final" wedges along the core slots. By use of one preferred form of a disclosed apparatus, previously positioned wedges are repositioned axially along core slots automatically and generally contemporaneously with the performance of some other necessary manufacturing process to avoid the expenditure of additional incremental time associated with such repositioning step. Equipment usable for other preselected manufacturing operations may be used in the automated practice of the invention. In one specific exemplification, previously positioned wedges are repositioned along core slots during a previously known wire moving, wire shaping, or wedge setting operation. The equipment is provided with means for axially repositioning previously placed wedges relative to core slots while such apparatus is being used for also carrying out another preselected manufacturing operation.

4 Claims, 2 Drawing Figures

U.S. Patent     Jul. 10, 1979     4,160,316
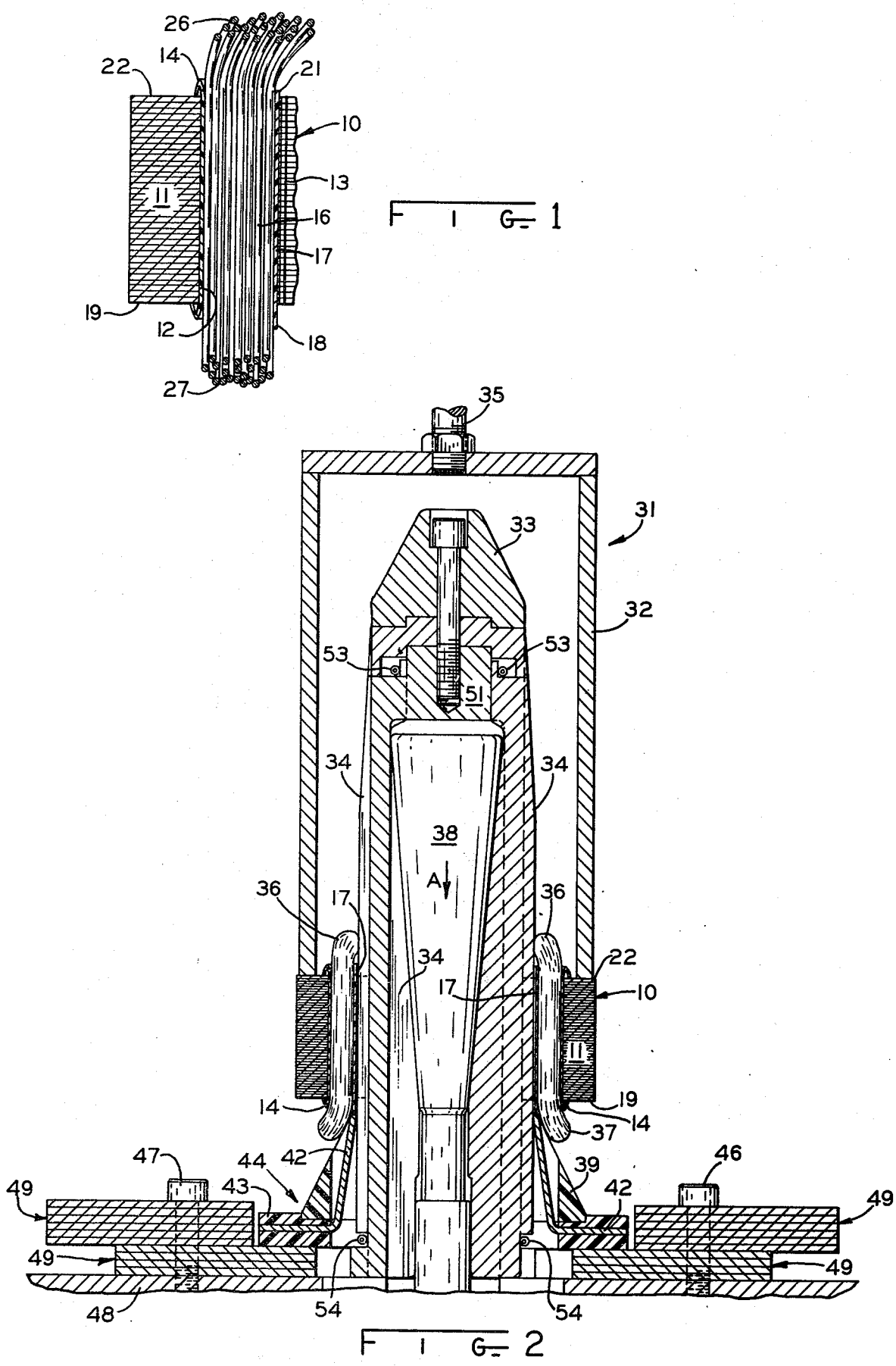

APPARATUS FOR POSITIONING INSULATING MEMBERS IN MAGNETIC CORE SLOTS

CROSS REFERENCE TO RELATED APPLICATION

This application is a division of co-pending application Ser. No. 779,777 filed Mar. 21, 1977 entitled "Apparatus and Method for Positioning Insulating Members In Magnet Core Slots", now U.S. Pat. No. 4,104,788, which is assigned to the assignee of the present invention, and the entire disclosure of which is hereby incorporated herein by reference.

BACKGROUND OF THE INVENTION

The present invention relates generally to apparatus for aligning and placing insulators, such as insulators called wedges, along slots of a magnetic core of a dynamoelectric machine.

Co-pending Kindig and Brown application Ser. No. 666,143, filed Mar. 11, 1976; and Bale U.S. Pat. No. 4,003,116 which issued Jan. 18, 1977, now U.S. Pat. No. 4,026,009 are both directed to subject matter that is generally related to the subject matter of this application; and the entire disclosures of such application and patent are specifically incorporated herein by reference.

In the manufacture of dynamoelectric machine stator assemblies, diverse operations are performed in order to place winding material and various insulating material members in and along axially extending slots of a magnetic core; and in order to properly orient, shape, or position the insulating material members and winding material relative to the slots, bore, or end faces of the magnetic core.

One method used heretofore in the manufacture of stator assemblies has involved placing insulating material, such as an epoxy coating or "slot liners" along the interior walls of slots that extend axially along a magnetic core and that open onto the bore of the core. Thereafter, winding turns of a first winding phase have been axially inserted along the slots, and fiber material wedges have temporarily been placed in the slots to hold the winding turns in the proper position therein. Then, at a later point in time, the temporary wedges have been removed and thrown away; and insulators known as "phase", "window", or "H" insulators have been positioned over the winding material already in the slots; legs of the window insulation have been pressed back into the slots; and winding turns of a second winding phase have then been placed in the core slots.

In addition to all of the above, "final" slot closure insulators have been placed at the slot openings (between the slot accommodated winding conductors and bore) in order to prevent any winding conductors from moving out of the core slots. The above-referenced Bale patent clearly reveals methods and apparatus that may be utilized for the purpose of "setting" the final slot closure insulators or "wedges", and to generally simultaneously "shape" winding end turn envelopes.

On the other hand, the above-referenced Kindig and Brown application fully discloses methods and apparatus that may be utilized when "separator" or "between phase" insulators are to be placed in core slots after winding conductors of a first winding phase have been placed therein, but before winding conductors of a second winding phase are placed in the same slots.

Persons of ordinary skill in the art will recognize that motors of different designs may be manufactured with winding arrangements such that some core slots will be shared by conductors of different phases, while other slots may be occupied by conductors of only one phase. Moreover, "shared slots" will usually include a phase separator wedge, and usually all of the slots will be provided with a slot closure wedge. Persons skilled in the art will also recognize that the wedges—whether of the phase separator or slot closure type—may be placed in the core slots substantially concurrently with the placement of conductors therein, or after the conductors have been placed in the slots. Such persons will also recognize that such insulators are called "wedges" even though they are seldom, if ever, actually wedge-like in shape.

The above referenced Kindig and Brown application represents one mode of carrying out the latter approach just mentioned, while winding, injecting, and wedging equipment and processes of the type shown in Arnold et al U.S. Pat. No. 3,973,601 or injecting and wedging equipment typified by Hill U.S. Pat. No. 3,324,536 represent modes of carrying out the former. For purposes of providing further background information, the entire disclosures of the just mentioned Arnold et al. and Hill patents are also incorporated herein by reference.

Regardless of the actual process or equipment used, it is desirable that the "final" slot closure or "final" phase separator wedges be generally centered, lengthwise along the axially extending core slots, so that at least generally similar amounts of wedge material extend out of the slots at each core face.

Some processes presently utilized for placing wedges—particularly temporary wedges—result in "uneven" wedge placement, and if such wedges were to be used permanently, it would be necessary for operators to manually position and center the wedges axially along the core slots.

In view of all of the foregoing, it should now be understood that it would be desirable to provide new and improved apparatus that would establish the desired proper position of axially off center insulators without the need to resort to extra manual labor steps.

Accordingly, an object of the present invention is to provide a new and improved apparatus for axially repositioning previously placed but axially off center insulators (e.g., wedges) in the slots of magnetic cores.

It is a more specific object of the present invention to provide a new and improved apparatus for axially repositioning previously placed insulators in combination with (and generally contemporaneously with) the performance of at least one other manufacturing process step whereby there is no incremental amount of labor and time associated with repositioning such insulators.

Yet another object of the present invention is to provide new and improved apparatus of the type just mentioned which do not require large incremental capital investment or tooling expense in order to be economically put into use.

SUMMARY OF THE INVENTION

In carrying out the above and other objects of the present invention in one preferred form thereof, I provide a new and improved apparatus which permits the dispensing with temporary and disposable fiber wedges, and which permits the use of permanent insulators made from known insulator material (e.g., polyethylene terephalate, commonly available under the tradename "MYLAR") are used in lieu of temporary fiber wedges. Moreover, my preferred apparatus permits the direct substitution of "MYLAR" wedges for temporary fiber wedges, even though such wedges are not axially centered in core slots, without requiring the performance of manual labor in order to axially reposition the "final" wedges along the core slots.

In brief, I provide a new and improved apparatus whereby previously positioned wedges are repositioned axially along core slots automatically generally contemporaneously with the performance of some other necessary manufacturing process. Thus, the previously positioned wedges are repositioned without the expenditure of additional incremental time associated with such repositioning step. Moreover, multiple wedges are repositioned generally at the same time, thus magnifying the time and labor savings associated with the use of may apparatus. In addition, equipment already available and in use for other preselected manufacturing operations may be readily modified or adapted, at low cost, in order to permit the automated practice of my invention.

In one specific exemplification of the invention, previously positioned wedges are repositioned along core slots during a previously known wire moving, wire shaping, or wedge setting operation. In this exemplification, previously known wire moving, wire shaping, or wedge setting equipment is initially provided (or later retrofitted) with means for axially repositioning previously placed wedges relative to core slots while such apparatus is being used for also carrying out the preselected manufacturing operation for which such apparatus was otherwise primarily designed.

The subject matter which I regard as my invention is particularly pointed out and distinctly claimed in the concluding portion of this specification. The invention itself, however, both as to its organization and mode of operation, together with further objects and advantages thereof, may best be understood by reference to the following description taken in connection with the accompanying drawing.

BRIEF DESCRIPTION OF THE DRAWING

FIG. 1 is a cross-sectional view, in elevation, with parts removed and parts broken away, of a slotted magnetic core; and illustrates the relative position of winding conductors, a core slot, and a wedge, prior to practicing the present invention in one form thereof; and FIG. 2 is a cross-sectional view in elevation, with parts broken away and parts removed, of a previously known apparatus modified so as to embody the invention in one form.

DESCRIPTION OF THE PREFERRED EMBODIMENTS

With initial reference to FIG. 1, a stator assembly generally denoted by the reference numberal 10 has been shown in order to explain in more detail various aspects of the present invention. The assembly 10 includes a magnetic core 11 which has a plurality of axially extending slots 12 therein. Each such slot, enclosed at its radially outermost portion, communicates at an open end (or slot opening) with the axially or longitudinally extending bore 13 of the core. Disposed within at least some of the slots are slot liner insulators 14, the side turn portions 16 of a winding, and a wedge 17.

It will be understood that wedge 17 may be a between phase insulator-assuming that side turn portions of another winding phase are to be added to a slot on top of the winding material already in such slot. On the other hand, if ultimately the only conductors in a slot are to be those behind a wedge 17, then the wedge 17 may be the final, or slot closure wedge.

The insulator illustrated for exemplification as a wedge 17 in FIG. 1 may be formed of any suitable material—such as MYLAR material. Close observation of FIG. 1 will reveal that the wedge 17 is not longitudinally or axially centered relative to slot 12. Thus, a greater length of wedge 17 at wedge end 18 protrudes beyond core face 19 as compared to wedge end 21. In some cases in face, wedge end 21 may be located far down within a slot.

Heretofore, when temporary fiber wedges were used rather than wedges 17, the uncentered condition of the fiber wedges was immaterial, since they were manually removed long prior to finishing the stator assembly 10. In the interest of reducing the cost associated with wasted fiber wedge material and manual removal of the same, the permanent insulator material wedges 17 now may be used, but it will be understood that the axially uncentered condition of the wedges 17 must be corrected.

It also will be understood that it would be extremely desirable to provide a method of repositioning the previously positioned wedges 17 during a subsequent or prospective preselected manufacturing operation without requiring the expenditure of additional time or labor because of the repositioning of the wedges 17. The importance of this becomes even more important when it is recalled that the stator assembly 10 actually includes a plurality of wedges 17.

Attention now is directed to FIG. 1 and the winding end turn portions 26, 27. It will be noted that the end turn envelope at least partly established by end turn portions 26 projects into interfering relationship with an imaginary cylinder forming an extension of the bore 13. It usually is the case that the end turn envelope containing end turn portions 26 will be at least partly shaped and moved at least to an intermediate position so as to better accommodate a second winding phase that is yet to be placed in slots of the core 11. Moreover, it is usual practice to at least lightly form the end turn envelope containing the end turns 27. Although various types of equipment and diverse methods may be practiced to accomplish this result, one particular approach is described in the above-referenced Bale U.S. Pat. No. 4,003,116.

In that patent, a wedge setting and winding end turn shaping apparatus is shown, among other things. For convenience, a preferred form of utilizing the present invention, and a preferred exemplification of the invention, will now be described in conjunction with processes and apparatus similar to that shown and described in the referenced Bale patent.

In FIG. 2 I have shown apparatus 31 that may be used for purposes similar to those described by Bale and that exemplifies one form of the present invention.

More specifically, before using the apparatus 31, the push down yoke 32 which constitutes a means for moving the core will be raised clear of the cap 33 of the apparatus. Then the stator assembly 10 of FIG. 1 is placed over the cap 33, oriented so that the slot openings of the core 11 are aligned with the blades 34, and a not shown ram cylinder, operative to drive the yoke rod 35, is energized in order to move the stator assembly 10 until the ram cylinder bottoms out. At that time, the stator assembly 10 is in the position thereof as shown in FIG. 2. As the stator is moved downwardly in FIG. 2, the end turn envelopes 36 and 37 are moved to the positions thereof as also shown in FIG. 2. After the push down yoke 32 stops moving, cam 38 is actuated. Actuation of cam 38 in the direction of arrow A causes blades 34 to "set" the wedges 17, and further shape (through interaction with shaping ring 39) the end turn envelope 37 by moving conductors in the envelope relative to the magnetic core-all of this being substantially as described in more detail in the referenced Bale patent. Thus, it is understood, that the shaping ring 39 constitutes a means for moving conductors relative to the magnetic core.

In carrying out the procedures just discussed, the previously positioned but not "centered" wedges 17 will have been, according to my preferred method, repositioned axially relative to the core slots 12 and core faces 19 and 22 as the stator assembly reached the final position thereof shown in FIG. 2, and also prior to actuation of the cam 38.

The means for accomplishing this desirable repositioning result may take different forms. However, in the embodiment shown in FIG. 2., such means includes a plurality of spring steel wedge pushers or stops 42. In the apparatus 31, the pushers 42 are carried by the bottom ring portion 43 of a forming ring assembly 44. However, depending on the particular type of apparatus used while practicing the invention, the wedge pushers or "stops" may be carried by any suitable part of such apparatus, as will be understood.

When cores of different stack heights (i.e., different axial lengths) are to be operated on, the screws 46, 47 are loosened, these screws normally being tightened into machine base 48. Then a suitable number of shims 49 are moved into or out of position under the bottom ring portion 43 of the forming ring assembly 44. The screws 46, 47 are then retightened. As will be understood, this will cause the spring members to be raised or lowered to compensate for different core stack heights.

Although it is apparent from reading the above-referenced Bale patent; it is now further noted, for purposes of description, that the blades 34 (carried in slotted cage 51) return to an initial or "ready" position under the influence of garter springs 53, 54 when the cam 38 is raised back to its initial position.

For purposes of emphasis, the method of utilizing the present invention will now again be described with reference to utilization of the apparatus 31.

The wedges 17 will have been previously prepositioned in the slots 12, and the stator assembly 10 will then be placed on the nose or cap 33 with the extra wedge length directed downwardly as viewed in FIG. 2. At this time, the wire trapped behind the wedges 17 will be forcing the wedges against the press blades 34. As the stator assembly is forced down the arbor means that includes cage 51 and blades 34 by the action of push down yoke 32, the ends 18 of the wedges 17 will contact the upper or free ends of the wedge stops (or pushers) 42. Then, as the core 11 of the stator assembly 10 moves to its final position (shown in FIG. 2), the relative position of the wedges and core is changed so that the wedges are repositioned and generally centered axially along the core slots.

After movement of the push down yoke stops, the blades 34 expand into the core slots to radially move and "set" the wedges 17, and movement of the blades 34 moves the flexible spring steel wedge pushers 42 outwardly away from the wedges. Thus, the pushers 42 will then no longer affect the wedge position.

While preferred embodiments of the present invention have been described herein in relation to specific known processes and apparatus, it will be understood that the invention itself is not so limited; and changes and modifications may be made without departing from the invention. It is therefore intended in the appended claims to cover all such changes and modifications that fall within the spirit and scope of the invention defined by such claims.

I claim:

1. Apparatus for use in axially repositioning insulators that have been previously positioned in axially extending slots of a magnetic core, said apparatus including arbor means for guiding a stator assembly therealong and in a predetermined aligned relationship therewith, said apparatus further including means for contacting and arresting movement of at least some of the previously positioned insulators while the core is moved relative to such means for contacting whereby the at least some of the previously positioned insulators may be repositioned relative to the core, and said apparatus further including means for moving the core axially along the arbor means.

2. The apparatus of claim 1 wherein the apparatus further comprises means for moving at least some conductors in an end turn envelope of the stator assembly relative to the magnetic core.

3. The apparatus of claim 1 wherein said apparatus further comprises means for setting the previously positioned insulators after such insulators have been repositioned axially within the core slots.

4. The apparatus of claim 1 wherein the apparatus further includes means for moving the previously positioned insulators radially outwardly relative to the arbor means after the insulators have been repositioned axially relative to the core slots.

* * * * *